US008437455B2

United States Patent
Dutta et al.

(10) Patent No.: US 8,437,455 B2
(45) Date of Patent: May 7, 2013

(54) SYSTEM, METHOD AND COMPUTER PROGRAM PRODUCT FOR GLOBALLY PORTABLE INTERACTIVE VOICE RESPONSE (IVR) SYSTEMS

(75) Inventors: Siddhartha Dutta, Glendale, AZ (US); John Bowen, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 342 days.

(21) Appl. No.: 12/686,015

(22) Filed: Jan. 12, 2010

(65) Prior Publication Data
US 2011/0170673 A1 Jul. 14, 2011

(51) Int. Cl.
*H04M 1/64* (2006.01)
*H04M 3/42* (2006.01)

(52) U.S. Cl.
USPC .................................... 379/88.23; 455/414.1

(58) Field of Classification Search ...... 379/88.2–88.23; 455/466; 705/14.9
See application file for complete search history.

(56) References Cited

U.S. PATENT DOCUMENTS

| 6,728,353 | B1 | 4/2004 | Espejo et al. | |
|---|---|---|---|---|
| 7,412,260 | B2 | 8/2008 | Gailey et al. | |
| 7,787,860 | B2 * | 8/2010 | Espejo et al. | 455/406 |
| 7,970,648 | B2 * | 6/2011 | Gailey et al. | 705/14.49 |
| 2005/0069102 | A1 | 3/2005 | Chang | |
| 2006/0159241 | A1 | 7/2006 | Jagdish | |
| 2007/0015518 | A1 | 1/2007 | Winter | |

OTHER PUBLICATIONS

PCT International Search Report and Written Opinion dated Mar. 15, 2011 in PCT/US2011/020627.
International Preliminary Report on Patentability dated Mar. 9, 2012 in PCT Application No. PCT/US2011/020627.

* cited by examiner

*Primary Examiner* — Mohammad Islam
(74) *Attorney, Agent, or Firm* — Snell & Wilmer L.L.P.

(57) ABSTRACT

A server receives a customer service request and customer identification information associated with the customer service request. A home location of the customer is identified based, at least in part, on the customer identification information. An interactive voice response application is selected based, at least in part, on the home location. The selected interactive voice response application is provided to a voice portal, wherein the voice portal services the customer service request.

18 Claims, 5 Drawing Sheets

SYSTEM, METHOD AND COMPUTER PROGRAM PRODUCT FOR GLOBALLY PORTABLE INTERACTIVE VOICE RESPONSE (IVR) SYSTEMS

BACKGROUND OF THE INVENTION

1. Field of the Invention

The present invention relates generally to the field of interactive voice response systems, and more particularly to globally portable interactive voice response solution or application.

2. Related Art

Enterprises that provide products and/or services often provide customer support to their customers for various purposes such as, but not limited to, inquiring about the products and/or services, activating/deactivating services, registering complaints, providing feedback, and the like. Such customer support may often be provided over telephone calls. The enterprises may employ Customer Care Professionals (CCPs) to respond to telephone calls and provide customer support. However, employing skilled CCPs increases the overhead costs of the enterprise. Alternatively, enterprises may deploy Interactive Voice Response Systems (IVR systems) to provide customer support.

Enterprises with a global or multi-regional presence may outsource the customer support functions to third party vendors. The third party vendors may be local call centers or contact centers if the regional language of communication is different from the language used in the enterprises' home regions. The third party vendors may employ CCPs adept in multiple languages. Employing such third party vendors further increases the operational cost of the enterprise. Some enterprises with global or multi-regional presence may receive calls from the customer at the local third party vendor, and route the customers' telephone calls to a central contact center at the enterprise's main establishments—often based overseas. Such call routing further increases the operational cost of the enterprises. The third party vendors providing customer support through an IVR system may deploy proprietary IVR system solutions, tailored to the enterprises' requirements.

In addition to increased operational costs, the distribution of the customer support functions over different regions, and over different third party vendors may introduce inconsistency and lack of familiarity in the customer support experience of the customers in different regions. For example, customers travelling from one region to another may often experience customer support whose format, content and language the customers are not familiar with.

Given the foregoing, a system, and a method are needed for providing customer support through interactive voice response systems to overcome the aforementioned problems.

BRIEF DESCRIPTION OF THE INVENTION

The present invention meets the above-identified needs by providing a method, system, and apparatus for providing customer service.

In accordance with one embodiment of the present invention, there is provided a method for providing customer service. The method receives, at a server, a customer service request. The method receives customer identification information associated with the customer service request. The method identifies a home location of the customer based, at least in part, on the customer identification information. The method selects an interactive voice response application based, at least in part, on the home location. Finally, the method provides the selected interactive voice response application to a voice portal, wherein the voice portal services the customer service request.

In accordance with a second embodiment of the present invention, there is provided a system for providing customer service. The system includes at least one processor and a memory in communication with the at least one processor. The memory stores a plurality of processing instructions for directing the at least one processor to receive, at a server, a customer service request; receive customer identification information associated with the customer service request; identify a home location of the customer based, at least in part, on the customer identification information; select an interactive voice response application based, at least in part, on the home location; and provide the selected interactive voice response application to a voice portal, wherein the voice portal services the customer service request.

In accordance with a third embodiment of the present invention, there is provided a computer program product for providing customer service. The computer program product includes a computer usable medium having control logic stored therein for providing customer service. The control logic includes a first computer readable code for receiving, at a server, a customer service request; a second computer readable code for receiving customer identification information associated with the customer service request; a third computer readable code for identifying a home location of the customer based, at least in part, on the customer identification information; a fourth computer readable code for selecting an interactive voice response application based, at least in part, on the home location; and a fifth computer readable code for providing the selected interactive voice response application to a voice portal, wherein the voice portal services the customer service request.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numerals indicate identical or functionally similar elements.

DETAILED DESCRIPTION

I. Overview

Figure 1:
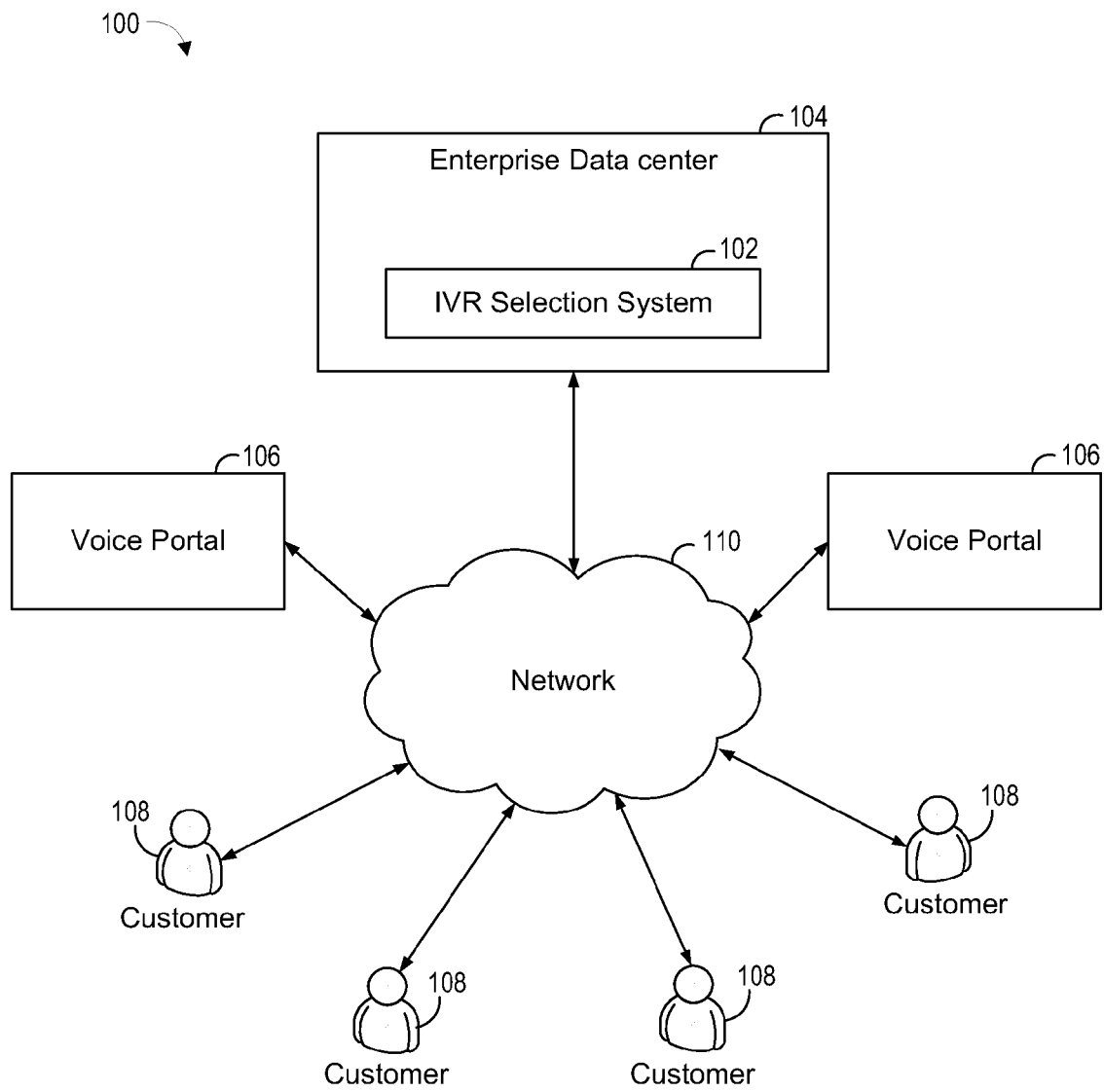
FIG. 1 is an exemplary environment in which a globally portable IVR system may be deployed.

Enterprises that provide products and/or services often provide customer support to their customers for various purposes such as, but not limited to, inquiring about the products and/or services, activating/deactivating services, registering complaints, providing feedback, and the like. The enterprises may deploy an Interactive Voice Response System (IVR system) to provide customer support. The customers may follow simple voice instructions, while providing feedback by various means such as DTMF tones and/or voice instructions.

The present invention is directed to a system, a method and an apparatus for providing a globally portable IVR system (referred to herein as IVR system). The IVR system may be hosted at a datacenter of the enterprise (referred to herein as enterprise datacenter). The IVR system may include various IVR applications corresponding to the various regions in which the enterprise operates. In various embodiments of the present invention, the IVR applications are compliant to open standard technologies such as, but not limited to, Voice Extensible Markup Language (VXML), Call Control Extensible Markup Language (CCXML), and Speech Application Language Tags (SALT). VXML is a standard Extensible Markup Language (XML) format, developed by the World Wide Web Consortium (W3C), for specifying interactive voice dialogues between humans and computer systems. VXML is designed to provide a Voice User Interface to a voice browser. CCXML is designed to inform the voice browser how to handle the telephony control of the voice channel. SALT is an XML format that is used in HTML and XHTML pages to add voice recognition capabilities to web based applications.

In one embodiment, the present invention may be employed by global enterprises for servicing customers over a telephony infrastructure. The IVR system may service the customers with the IVR application corresponding to the home region of the customer.

The present invention allows customer servicing traffic to be shared by enterprises across platforms offered by multiple service providers. This will introduce better availability and disaster recovery to customers. Further, customers will be able to use voice portals in any country while they are traveling for self-service. Enterprises will also be capable of moving traffic away from service providers to other service providers without impacting the business operations of the enterprise.

A "global enterprise" may be a product seller and/or a service provider. For example, a global enterprise may be a seller of consumer products, banking and financial services provider, travel agency, and the like. A global enterprise may employ IVR systems to service its customers that try to get in touch with them by means of a telecommunication device, such as, but not limited to, a mobile phone or a fixed telephone.

A "customer" may be an individual or an organization that makes use of one or more of the services and/or products of the global enterprise.

A "helpline" may be a global or local telephone number that the customer may dial in order to reach the IVR System.

II. System

The present invention is now described in terms of an exemplary system, hereinafter referred to as an "IVR selection system," in which various embodiments of the present invention may be implemented. It will be apparent to one skilled in the relevant art(s) that the above invention has been described by way of illustration and not limitation, and that the present invention may be implemented in alternative embodiments.

Various embodiments of the present invention may be deployed in different environments. FIG. 1 illustrates an exemplary environment in which an IVR selection system 102 may be deployed, according to one embodiment of the present invention. Environment 100 includes the IVR selection system 102 hosted at an enterprise datacenter 104, one or more voice portals 106, one or more customers 108, and a network 110.

IVR selection system 102 provides location independent self service customer support to customers 108. In other words, IVR selection system 102 may provide IVR applications corresponding to a home region of customer 108 irrespective of the current location of customer 108. This may be advantageous to travelling customers 108, for example, since customers 108 travelling to a foreign country may experience the same IVR application as that in customer's 108 home location, and having a menu structure and language of communication with which customer 108 is familiar.

IVR Selection System 102 is comprised of one or more servers on which different IVR applications run. The servers are coupled with host interfaces that leverage the customer identification information captured at the voice portal 106 to gather information on the customer 108 and to determine the origin and/or location of the customer 108 by accessing one or more backend servers. The servers also provide the application running on the voice portal 106 with information that enables the voice portal 106 to launch the appropriate IVR application for the customer. As a non-limiting example, the IVR selection system 102 can be formed of a composite application suite running on application servers and intelligent contact management servers. The selection of which IVR application to launch depending the customer identifier need not be made by a single system. Components hosted on application servers can collect the customer identifier and make backend queries to identify the origin of the customer and then return that information to the application running on a voice portal. The voice portal can then pass that information to an intelligent contact manager to reconfigure the session and solicit requests to run the appropriate VR application script.

IVR selection system 102 triggers voice portal 106 to launch the appropriate IVR application based on information the IVR selection system receives from the customer identification. Each IVR application may be specific to a certain geographic region, a certain language of interaction, a certain type of service or product, and so forth. In one embodiment, the IVR applications are compliant to open standard technologies such as, but not limited to, VXML and CCXML.

IVR selection system 102 may also include one or more interfaces to databases containing customer information of all the customers of the enterprise. The customer information may include, without limitation, identification information of customer 108, home location of customer 108, preferred language of communication of customer 108, product purchase or service usage history of customer 108, billing information of customer 108, membership benefit information of customer 108, preferences of customer 108, and the like.

IVR selection system 102 may receive a customer service request. In one embodiment, IVR selection system 102 receives the customer service request from customer 108 through any suitable telephony device such as, but not limited to, a telephone, a mobile phone, a SIP phone, a soft phone, and the like. In another embodiment, IVR selection system 102 receives the customer service request from voice portal 106. IVR system 102 may receive identification information of customer 108 associated with the customer service request. In one embodiment, the identification information may be obtained from the customer service request. The identification information may be in the form of voice messages, DTMF tones, or packet data included within the customer service request. IVR selection system 102 may determine which of the multiple IVR applications to present to customer 108, based on the identification information of customer 108. In one embodiment, IVR selection system 102 determines a home location of customer 108 based on the identification information of customer 108. The home location of customer 108 may be the country of residence of customer 108, the region in which customer 108 purchased the product or service, for example, the issuing country of a credit card of customer 108, and so forth. IVR selection system 102 may then select an IVR application corresponding to the home location of customer 108. This may be advantageous, since customer 108 may experience a familiar IVR application, i.e., the home location IVR application, irrespective of the actual location of customer 108. IVR selection system 102 may then provide the selected IVR application to voice portal 106. IVR selection system 102 is described below in detail in conjunction with FIG. 2.

Voice portal 106 is an information portal that customer 108 may access through a telephone call. In one embodiment, voice portal 106 may be an enterprise voice portal, which provides customized access to customer support such as, but not limited to, bank account information, credit card balance information, technical support, service subscription requests, billing information, and the like. In another embodiment, voice portal 106 may be a consumer voice portal, which provides access to general information such as, but not limited to, movie show timings, information on public transport, flight information, traffic updates, weather updates, stock quotes, and the like. One or more telephone numbers may be associated with voice portals 106. Customers 108 may dial the telephone numbers associated with voice portals 106 to access voice portals 106. Upon receiving a call, voice portal 106 may present an IVR application to customer 108. In one embodiment, voice portal 106 may host a local IVR application. The local IVR application may retrieve the identification information of customer 108. The identification information includes, for example, a name, a date of birth, a credit card number, a credit card PIN, a customer ID, and the like. The local IVR application may then forward the identification information to IVR selection system 102. The IVR selection system 102 may then identify a region specific IVR application based on customer's 108 identification information, and download the region specific IVR application to voice portal 106. Voice portal 106 may then present the region specific IVR application to customer 108.

Voice portal 106 is located on at least one server and is coupled with a telephony interface to which telephone channels (analog, digital, or IP) can plug into voice portal 106. Voice portal 106 may monitor customer 108 inputs for special escape phrases that takes customer 108 to a high-level assistant or alter customer's 108 preferences such as volume or text-to-speech characteristics. As a non-limiting example, voice portal 106 can be formed of a standard commodity server on which a VoiceXML Interpreter is installed and can include telephony cards to interface with a public telephone network. Voice portal 106 can be comprised of a single or multiple servers depending on the capacity requirements. For example, if a business requirement is to have a voice portal with less than 90-100 ports (depending on how many concurrent phone calls are required to be handled), a single server will suffice, although it would be preferred to have multiple servers for disaster recovery or business continuation purposes.

The local IVR application may accept inputs from customer 108 as voice inputs, and touch tones or Dual Tone Multi Frequency (DTMF) tones. In one embodiment, the local IVR application may cause the voice portal 106 to convert customer's 108 inputs into computer readable digital information that may be used to retrieve information requested by the customer. Voice portal 106 may use DTMF decoders to convert touch tone inputs into computer readable digital information, and various audio processing techniques such as automated speech recognition, continuous speech processing, speech to text, and the like to convert the voice inputs into computer readable digital information. The local IVR application may then forward the computer readable digital information to IVR selection system 102.

In one embodiment, voice portal 106 may route the call to a live CCP if customer 108 chooses to speak to a CCP, or in the event that an IVR application is not currently available for customer 108.

In one embodiment, voice portal 106 is connected to the IVR selection system 102 through private data links. The private data links allow IVR applications and data to be exchanged between the IVR selection system 102 and voice portal 106. The Voice Portal 106 and the IVR Selection system 102 may also be inter-connected by any kind of private or public data link (supporting HTTP/HTTPS). An enterprise may choose, based on security, performance, and standards, on how to connect the Voice Portals 106 with enterprise datacenter 104.

In one embodiment, voice portal 106 may be hosted by one or more third party vendors. The third party vendors may also have call switching equipment, Automatic Call Distributors, and other such contact center equipment associated with providing customer care or customer support to customers 108. In another embodiment, voice portal 106 may be hosted by the enterprise on enterprise datacenter 104.

In various embodiments, voice portal 106 may be implemented using VXML. VXML allows voice applications to be developed and deployed in an analogous way to HTML for visual applications. VXML documents are interpreted by a voice browser. In one embodiment, voice portal 106 may be implemented using multiple voice browsers, the voice browsers being interfaced with network 110.

Customers 108 may use a voice communication instrument to dial in to the voice browser and access various IVR applications. Customers 108 may access voice portals 106 using any voice communication instrument known in the art such as, but not limited to, a telephone, a session initiation protocol (SIP) phone, a soft-phone, a cellular telephone, a satellite phone, and the like. Customers 108 access voice portals 106 through network 110. Examples of network 110 include a public switched telephone network (PSTN), a circuit switched telephone network, a wide area network (WAN), a local area network (LAN), an Ethernet, the Internet, an Intranet, a cellular network, a satellite network, or any other suitable network for transmitting voice and data. Network 110 may be implemented as a wired network, a wireless network or a combination thereof.

Figure 2:
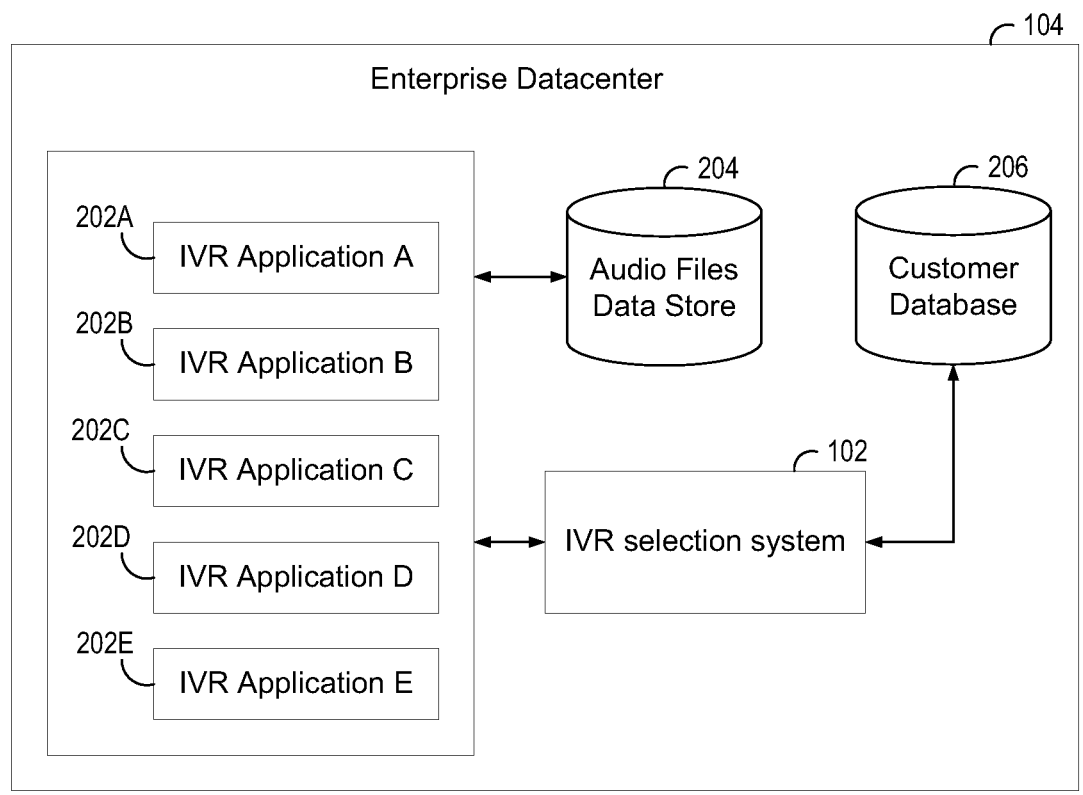
FIG. 2 is a schematic illustration of an exemplary block diagram of the enterprise datacenter.

FIG. 2 is a schematic illustration of an exemplary block diagram of enterprise datacenter 104, according to one embodiment of the present invention. Enterprise datacenter 104 includes IVR selection system 102, a plurality of IVR applications 202A-E, an audio files data store 204, and a customer database 206. In one embodiment, enterprise datacenter 104 is located at the enterprises' headquarters. In some embodiments, multiple enterprise datacenters 104 may be located and used throughout the world.

In some embodiments, IVR selection system 102 may also include a call router. The call router may route the call to a live CCP if customer 108 chooses to speak to a CCP, or in the event that an IVR application is not currently available for the home region of customer 108.

Depending on the implementation, IVR selection system 102 may receive the identification information of customer 108 from the local IVR application in the form of computer readable information. The IVR selection system receives information in terms of data generated by voice portal 106. Any speech/voice or DTMF tone input is interpreted and decoded by voice portal 106 and the application running on it, and the decoded information is passed onto IVR selection system 102 in a computer readable format.

Upon receipt of the identification information of customer 108, IVR selection system 102 identifies the home location of customer 108. IVR system 108 may query customer database 206 using the identification information of customer 108 to identify the home location of customer 108. For example, IVR selection system 102 may query customer database 206 using the credit card number of customer 108, and identify the home location, i.e., the country of issue of the credit card. In some embodiments, in addition to the home location of customer 108, IVR selection system 102 may also identify the preferred language of communication of customer 108, product purchase or service usage history of customers 108, membership benefit information of customer 108 (e.g. Silver Privilege, Gold Privilege, etc), and the like.

IVR selection system 102 may then select an IVR application 202A-E corresponding to the home location of customer 108. In various embodiments, IVR selection system 102 may select IVR application 202A-E based on the home location of customer 108 and various other business rules, such as preferred language of communication of customer 108, product purchase or service usage history of customers 108, membership benefit information of customer 108, preferences of customers 108, and the like.

IVR selection system 102 may provide the selected IVR application 202A-E to voice portal 106, for servicing customer 108. In one embodiment of the present invention, the customer may opt to talk to a Customer Care Professional (CCP). In such a scenario, IVR selection system 102 may connect the customer 108 to a CCP in customer's 108 home location.

IVR applications 202A-E accept inputs from customers 208 in the form of voice inputs or DTMF tones, communicate with enterprise datacenter 104 to retrieve information requested by customer 108, and present the information retrieved based on the inputs of customer 108 using, for example, audible speech responses. IVR applications 202A-E may be specific to a certain geographic region, a certain language of interaction, a certain type of service or product, and so forth. In one embodiment, the IVR applications are compliant to open standard technologies such as, but not limited to, VXML and CCXML.

In one embodiment, IVR application 202 may cause the voice portal 106 to convert customer's 108 inputs into computer readable digital information that may be used to retrieve the information requested by customer 108. IVR applications 202A-E may then use the computer readable digital information to retrieve information from an appropriate information source. The IVR application 202 may generate a database query, a web query or a web Universal Resource Locator (URL) based on the computer readable digital information, to retrieve information requested by customer 108. IVR applications 202A-E may query one or more information sources such as, but not limited to, various databases at enterprise datacenter 104, e.g., customer database 206, the internet, and the like. IVR applications 202A-E then provide audible speech responses to customers 108, based on the retrieved information. The retrieved information may be in the form of text. IVR application 202 may cause voice portal 106 to convert the retrieved information from text to speech using any technique known in the art.

Each IVR application 202A-E may be associated with one or more audio files stored in audio file data store 204 (not shown in FIG. 2). Each IVR application 202A-E is comprised of a set of VXML applications, a set of specific audio files recorded in a specific language or languages, and business logic and rules. Further, in the case of a speech recognition application, grammar files may also be included. The audio files include prompts and messages to be presented to customer 108 by the corresponding IVR application 202. The audio files may be stored in any suitable format including, without limitation, MP3, Windows® Media Audio (WMA), Advanced Audio Codec (AAC), Wave (WAV), and the like. IVR selection system 102 may provide the associated audio files to voice portal 106 along with IVR application 202.

Customer database 206 includes customer information of all the customers of the enterprise. The customer information may include, without limitation, identification information of customer 108, home location of customer 108, preferred language of communication of customer 108, product purchase or service usage history of customers 108, billing information of customer 108, membership benefit information of customer 108, preferences of customer 108, and the like.

Although enterprise datacenter 104 is described in conjunction with IVR selection system 102 according to one embodiment, it should be appreciated that enterprise datacenter 104 may include other components such as application servers, web servers, telephony interfaces, business logic modules, and the like, not shown in FIG. 2 for reasons of clarity.

Figure 3:
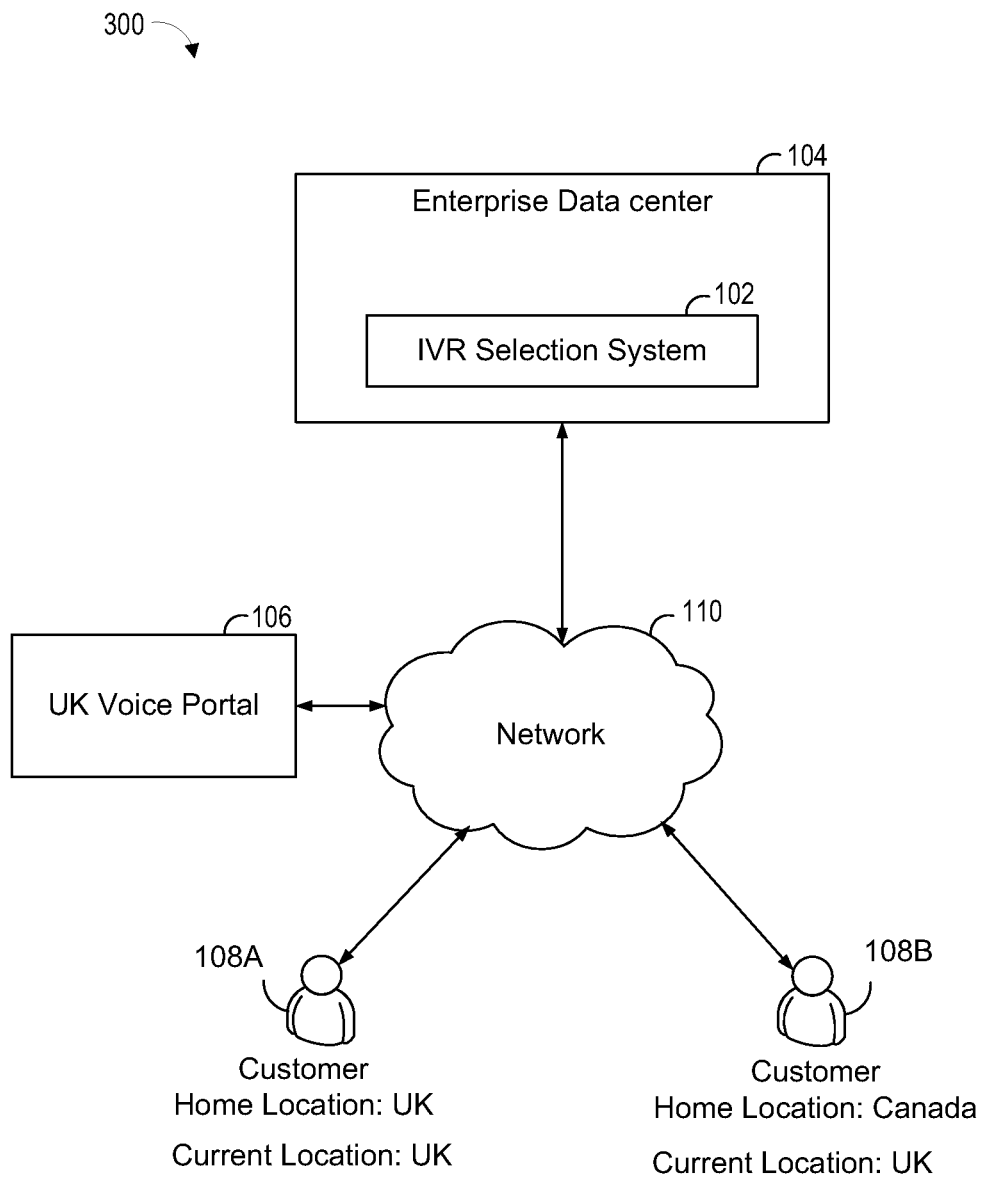
FIG. 3 is a schematic illustration of an exemplary implementation of the globally portable IVR System.

FIG. 3 is a schematic illustration of an exemplary implementation 300 of IVR selection system 102, according to one embodiment of the present invention. In the exemplary implementation 300, the enterprise may be a credit card company. The enterprise owns enterprise datacenter 104 which hosts IVR selection system 102. The home locations of customers 108A and 108B are, for example, the United Kingdom (UK) and Canada respectively. Customers 108A and 108B are, for example, currently in the UK. In other words, customer 108B is currently not in his home location, i.e., Canada, but is travelling in another country, i.e., the UK.

When customer 108A calls the local UK helpline number, he may be connected to the UK voice portal 106. The UK voice portal 106 presents the local IVR application, i.e., the UK IVR application to customer 108A. The UK IVR application prompts customer 108A to input the identification information. Customer 108A may enter the credit card number as the identification information. The UK IVR application forwards the credit card number of customer 108A to IVR selection system 102. IVR selection system 102 receives the credit card number and queries customer database 206 to identify the home location, i.e., issuing country of the credit card, of customer 108A. IVR selection system 102 identifies the home location of customer 108A as the UK. Thereafter, IVR selection system 102 instructs the UK voice portal 106 to continue using the UK IVR application to service customer 108A.

When customer 108B calls the local UK helpline number, he is also connected to the UK voice portal 106. The UK voice portal 106 presents the local IVR application i.e., the UK IVR application, to customer 108B. The UK IVR application prompts customer 108B to input the identification information. Customer 108B may enter the credit card number as the identification information. The UK IVR application forwards the credit card number of customer 108B to IVR selection system 102. IVR selection system 102 receives the credit card number and queries customer database 206, to identify the home location, i.e., issuing country of the credit card, of customer 108B. IVR selection system 102 identifies the home location of customer 108B as Canada. IVR selection system 102 identifies that customer 108B is a customer travelling in a country other than the home location of the customer. IVR selection system 102 may query customer database 206 for other parameters such as preferred language of communication. IVR selection system 102 may then select the appropriate IVR application 202A-E specific to the home location of customer 108B, i.e., Canada. IVR selection system 102 may then provide the selected Canadian IVR application 202 to the UK voice portal 106. IVR selection system 102 may also explicitly instruct the UK voice portal 106 to use the Canadian IVR application 202 to service customer 108B.

Any IVR application 202 downloaded onto voice portal 106 is cached into the voice portal's 106 memory for a period of time. The IVR application 202 is not deleted unless the IVR application 202 is deliberately accessed in the voice portal 106 to delete that specific application from the cache memory. However, the cache can be refreshed based on some predefined rules and any content is then either deleted or overwritten with new downloaded content.

Thus, a customer 108 travelling outside his home location may be serviced with the same IVR application as he would have been serviced with if he were in his home location. Customers 108 may receive a uniform self-service experience in any country across the world, even while they are traveling.

III. Process

Figure 4:
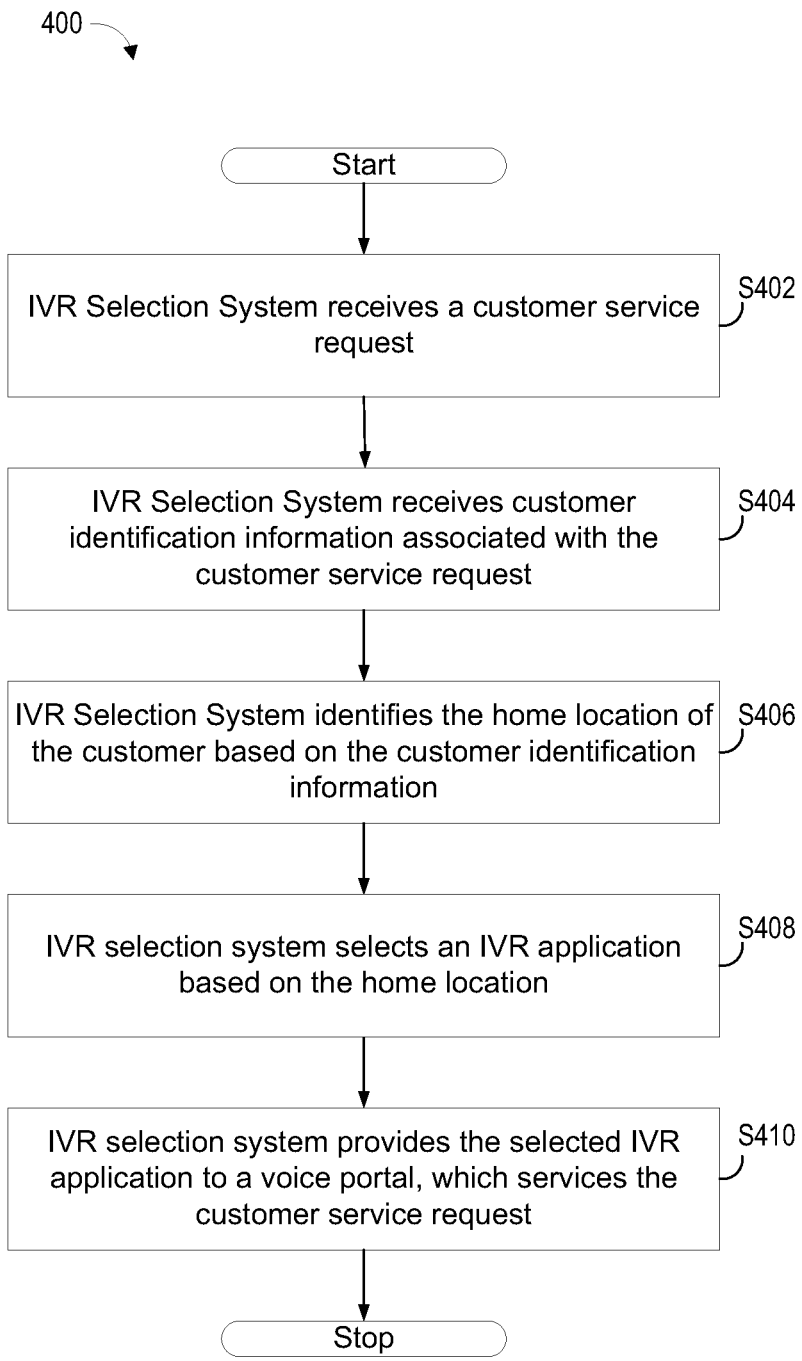
FIG. 4 is a flowchart illustrating an exemplary process for providing a globally portable IVR System.

FIG. 4 is a flowchart illustrating an exemplary process 400 of selecting IVR applications as implemented by IVR selection system 102, according to one embodiment of the present invention. At step S402, IVR selection system 102 receives a customer service request. The customer service request may be an incoming call on the helpline number of the enterprise. Alternatively the customer service request may be an indication of receipt of an incoming call. Yet another example of the customer service request may be a session identifier or call identifier of an incoming call. In one embodiment, IVR selection system 102 receives the customer service request from customer 108 through any suitable telephony device such as, but not limited to, a telephone, a mobile phone, a SIP phone, a soft phone, and the like. In another embodiment, IVR selection system 102 receives the customer service request from voice portal 106.

At step S404, IVR selection system 102 receives the identification information of customer 108 associated with the customer service request. The identification information may be comprised of one or more of a PIN number, a credit card number, a customer ID, a mobile phone number, a birth date, and the like. The identification information may be received in a computer readable format from voice portal 106. In some embodiments, the identification information may be converted to computer readable digital information using speech recognition or DTMF decoding at the voice portal 106.

At step S406, IVR selection system 102 identifies the home location of the customer 108, based on the identification information of customer 108. IVR selection system 102 may query customer database 206 using the identification information of customer 108 to identify the home location of customer 108.

At step S408, the IVR selection system 102 selects IVR application 202 based on the home location identified in step S406. IVR selection system 102 may consider other factors such as, but not limited to, the preferred language of communication of customer 108, product purchase or service usage history of customer 108, membership benefit information of customer 108 (e.g., silver level, gold level, etc), and the like, in selecting IVR application 202.

At step S410, IVR selection system 102 provides the selected IVR application 202 to voice portal 106. Voice portal 106 may use the selected IVR application 202 to service the customer service request. The selected IVR application 202 may present audio prompts to customer 108 to retrieve further inputs, retrieve information requested by customer 108 based on the inputs of customer 108, and present the retrieved information to customer 108 in audible speech responses.

IV. Example Implementations

The present invention may be implemented using hardware, software or a combination thereof, and may be implemented in one or more computer systems or other processing systems. However, the manipulations performed by the present invention were often referred to in terms, such as comparing or checking, which may commonly be associated with mental operations performed by a human operator. No such capability of a human operator is necessary, or desirable in most cases, in any of the operations described herein, which form a part of the present invention. Rather, the operations are machine operations. Useful machines for performing the operations in the present invention may include general-purpose digital computers or similar devices.

Figure 5:
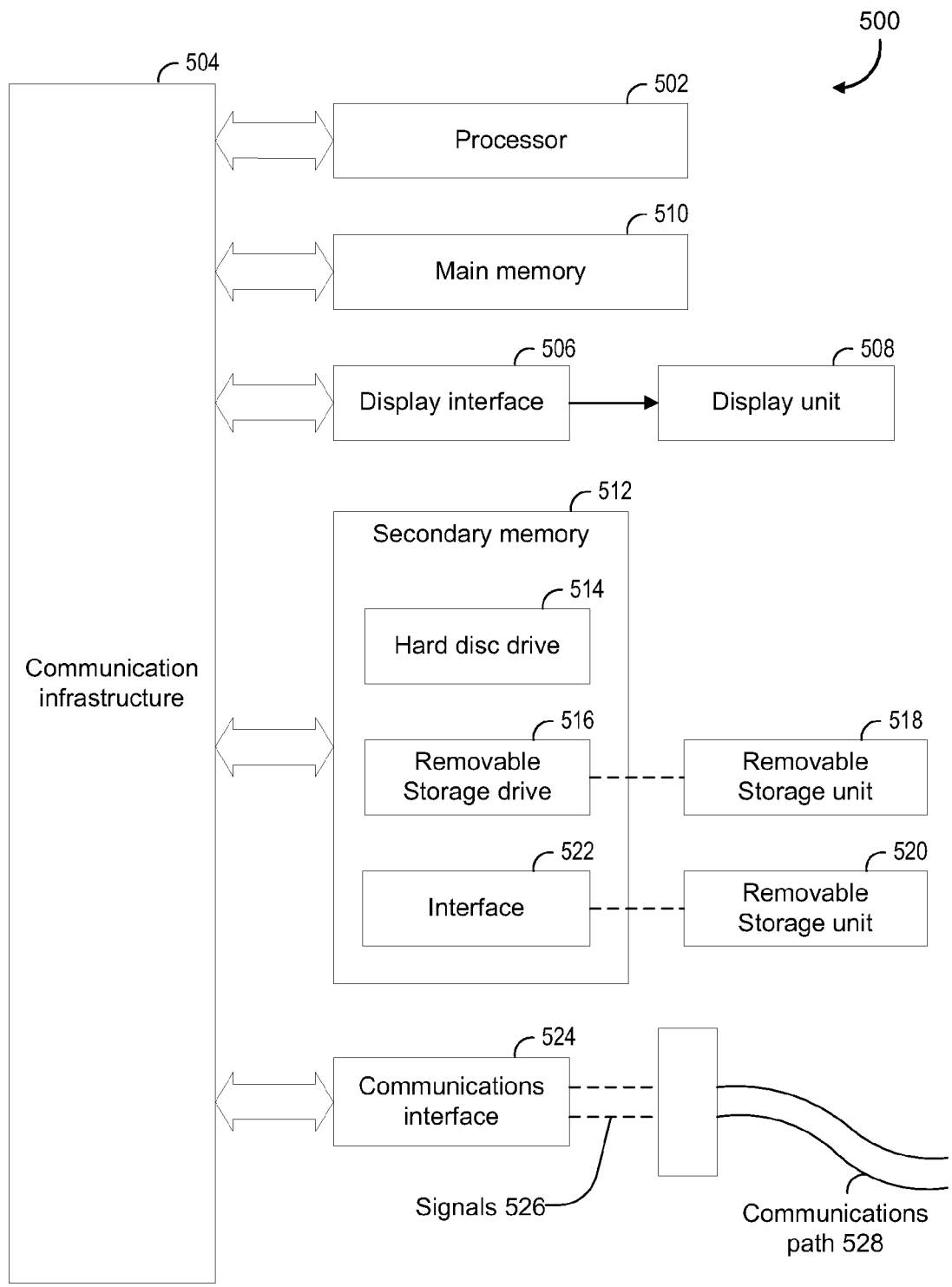
FIG. 5 is a block diagram of an exemplary computer system for implementing the present invention.

In fact, in accordance with an embodiment of the present invention, the present invention is directed towards one or more computer systems capable of carrying out the functionality described herein. An example of the computer systems includes a computer system 500, which is shown in FIG. 5.

The computer system 500 includes at least one processor, such as a processor 502. Processor 502 is connected to a communication infrastructure 504, for example, a communications bus, a cross over bar, a network, and the like. Various software embodiments are described in terms of this exemplary computer system 500. After reading this description, it will become apparent to a person skilled in the relevant art(s) how to implement the present invention using other computer systems and/or architectures.

The computer system 500 includes a display interface 506 that forwards graphics, text, and other data from the communication infrastructure 504 (or from a frame buffer which is not shown in FIG. 5) for display on a display unit 508.

The computer system 500 further includes a main memory 510, such as random access memory (RAM), and may include a secondary memory 512. The secondary memory 512 may further include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a well-known manner. The removable storage unit 518 may represent a floppy disk, magnetic tape or an optical disk, and may be read by and written to by the removable storage drive 516. As will be appreciated, the removable storage unit 518 includes a computer usable storage medium having stored therein computer software and/or data.

In accordance with various embodiments of the present invention, the secondary memory 512 may include other similar devices for allowing computer programs or other instructions to be loaded into the computer system 500. Such devices may include, for example, a removable storage unit 520, and an interface 522. Examples of such devices may include a program cartridge and cartridge interface (such as that found in video game devices), a removable memory chip (such as an erasable programmable read only memory (EPROM), or programmable read only memory (PROM)) and associated socket, and other removable storage units 520 and interfaces 522, which allow software and data to be transferred from the removable storage unit 520 to the computer system 500.

The computer system 500 may further include a communication interface 524. The communication interface 524 allows software and data to be transferred between the computer system 500 and external devices. Examples of the communication interface 524 include, but may not be limited to a modem, a network interface (such as an Ethernet card), a communications port, a Personal Computer Memory Card International Association (PCMCIA) slot and card, and the like. Software and data transferred via the communication interface 524 are in the form of a plurality of signals, hereinafter referred to as signals 526, which may be electronic, electromagnetic, optical or other signals capable of being received by the communication interface 524. The signals 526 are provided to the communication interface 524 via a communication path (e.g., channel) 528. A communication path 528 carries the signals 526 and may be implemented using wire or cable, fiber optics, a telephone line, a cellular link, a radio frequency (RF) link and other communication channels.

In this document, the terms "computer program medium" and "computer usable medium" are used generally to refer to media such as the removable storage drive 516, a hard disk installed in hard disk drive 514, the signals 526, and the like. These computer program products provide software to the computer system 500. The present invention is directed to such computer program products.

Computer programs (also referred to as computer control logic) are stored in the main memory 510 and/or the secondary memory 512. Computer programs may also be received via the communication infrastructure 504. Such computer programs, when executed, enable the computer system 500 to perform the features of the present invention, as discussed herein. In particular, the computer programs, when executed, enable the processor 502 to perform the features of the present invention. Accordingly, such computer programs represent controllers of the computer system 500.

In accordance with an embodiment of the invention, where the invention is implemented using software, the software may be stored in a computer program product and loaded into the computer system 500 using the removable storage drive 516, the hard disk drive 514 or the communication interface 524. The control logic (software), when executed by the processor 502, causes the processor 502 to perform the functions of the present invention as described herein.

In another embodiment, the present invention is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present invention is implemented using a combination of both the hardware and the software.

V. Conclusion

The various embodiments of the present invention described above have been presented by way of illustration, and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

We claim:

1. A method comprising:
receiving, by a computer based system for providing customer service, a customer service request from a voice portal associated with a first location;
receiving, by the computer based system, a transaction account identifier associated with the customer service request;
identifying, by the computer based system, a transaction account and a home location associated with the transaction account, in response to receiving the transaction account identifier, wherein the first location is not the home location, and wherein the transaction account identifier is associated with the transaction account;
selecting, by the computer based system, an interactive voice response application based, at least in part, on the transaction account and the identified home location;
providing, by the computer based system, the selected interactive voice response application to the voice portal associated with the first location and the transaction account;
converting, by the computer based system and through the voice portal associated with the first location, an oral customer service request to data; and
analyzing, by the computer based system and with the interactive voice response application associated with the home location, the data to determine the nature of the oral customer service request.

2. The method of claim 1, wherein receiving customer identification information comprises receiving customer identification information from one or more of DTMF tones, voice messages, or packet data included in the customer service request.

3. The method of claim 1, wherein the selected interactive voice response application comprises voice messages in a language associated with the customer's home location.

4. The method of claim 1, wherein the selected interactive voice response application comprises voice messages associated with the services associated with the customer's home location.

5. The method of claim 1 further comprising:
identifying, by the computer based system, unavailability of an interactive voice response application corresponding to the home location; and routing, by the computer based system, the customer service request to a customer care professional at the home location based on identifying the unavailability.

6. The method of claim 1, wherein the interactive voice response application and the voice portal employ at least one of Voice Extensible Markup Language (VXML), Call Control eXtensible Markup Language (CCXML), and Speech Synthesis Markup Language (SSML).

7. A system for providing customer service, the system comprising:
   a processor for servicing customer requests and communicating with a voice portal; and
   a non-transitory memory in communication with the processor;
   the processor, when executing a computer program, is configured to:
   receive, by the processor, a customer service request associated with a first location;
   receiving, by the processor, a transaction account identifier associated with the customer service request;
   identifying, by the processor, a transaction account and a home location associated with the transaction account, in response to receiving the transaction account identifier, wherein the first location is not the home location, and wherein the transaction account identifier is associated with the transaction account;
   selecting, by the processor, an interactive voice response application based, at least in part, on the transaction account and the identified home location;
   providing, by the processor, the selected interactive voice response application to the voice portal associated with the first location and the transaction account;
   converting, by the processor and through the voice portal associated with the first location, an oral customer service request to data; and
   analyze, by the processor based system and with the interactive voice response application associated with the home location, the data to determine the nature of the oral customer service request.

8. The system of claim 7, wherein the selected interactive voice response application comprises voice messages in a language associated with the customer's home location.

9. The system of claim 7, wherein the selected interactive voice response application comprises voice messages associated with the services associated with the customer's home location.

10. The system of claim 7, further configured to:
   identify, by the processor, unavailability of an interactive voice response application corresponding to the home location; and
   route, by the processor, the customer service request to a customer care professional at the home location based on identifying the unavailability.

11. The system of claim 7, wherein the interactive voice response application and the voice portal employ at least one of Voice Extensible Markup Language (VXML), Call Control eXtensible Markup Language (CCXML), and Speech Synthesis Markup Language (SSML).

12. The system of claim 7, further comprising a plurality of voice portals, each voice portal associated with different regions and/or countries.

13. A non-transitory computer-readable storage medium having control logic stored therein, which when executed by a computer based system for providing customer service cause the computer based system to perform operations comprising:
   receiving, by a computer based system for providing customer service, a customer service request from a voice portal associated with a first location;
   receiving, by the computer based system, a transaction account identifier associated with the customer service request;
   identifying, by the computer based system, a transaction account and a home location associated with the transaction account, in response to receiving the transaction account identifier, wherein the first location is not the home location, and wherein the transaction account identifier is associated with the transaction account;
   selecting, by the computer based system, an interactive voice response application based, at least in part, on the transaction account and the identified home location;
   providing, by the computer based system, the selected interactive voice response application to the voice portal associated with the first location and the transaction account;
   converting, by the computer based system and through the voice portal associated with the first location, an oral customer service request to data; and
   analyzing, by the computer based system and with the interactive voice response application associated with the home location, the data to determine the nature of the oral customer service request.

14. The medium of claim 13, wherein receiving customer identification information comprises receiving customer identification information from one or more of DTMF tones, voice messages, or packet data included in the customer service request.

15. The medium of claim 13, wherein the selected interactive voice response application comprises voice messages in a language associated with the customer's home location.

16. The medium of claim 13, wherein the selected interactive voice response application comprises voice messages associated with the services associated with the customer's home location.

17. The medium of claim 13, further configured to perform the method comprising:
   identifying, by the computer based system, unavailability of an interactive voice response application corresponding to the home location; and
   routing, by the computer based system, the customer service request to a customer care professional at the home location based on identifying the unavailability.

18. The medium of claim 13, wherein the interactive voice response application and the voice portal employ at least one of Voice Extensible Markup Language (VXML), Call Control eXtensible Markup Language (CCXML), and Speech Synthesis Markup Language (SSML).

* * * * *